3,169,566
// WEATHER RESISTANT LIGHT COLORED HALO-
// GENATED BUTYL RUBBER COMPOSITIONS

George J. Ziarnik, Elizabeth, N.J., assignor to Esso Research and Engineering Company, a corporation of Delaware
No Drawing. Filed Aug. 10, 1960, Ser. No. 48,562
6 Claims. (Cl. 152—330)

The present invention relates to improved halogenated butyl rubber compositions. More specifically, it deals with forming vulcanizates, particularly of white or pastel shades, having improved resistance to aging and discoloration.

In recent years a highly unique, low unsaturation type of rubbery copolymer, namely, halogenated butyl rubber, particularly chlorinated butyl, has been developed. Among the various uses suggested for halogenated butyl is employing it for tire sidewalls, especially premium grade white sidewalls. The automotive industry in particular further desires to make light and pastel colored parts from chlorinated butyl rubber, e.g., weather stripping, which would be in harmony with the various painted parts of an automobile. It would also be desirable to make halogenated butyl articles of white and pastel shades for insulation, plug coverings, weather strips, and hose, gaskets, etc.

However, one of the difficulties encountered in employing halogenated butyl rubber in such applications has been the tendency of such compositions to become sticky when exposed to natural weathering causing dirt readily to adhere to its surface. Naturally, such articles, particularly light colored or pastel compositions, readily acquire an unacceptable appearance. Washing the surface is of little help since the dirt soon returns to the tacky surface. This difficulty has been the prime reason why halogenated butyl has not yet been widely accepted for white tire sidewalls.

In accordance with the present invention, means are taught whereby the aging and weathering properties of halogenated butyl compositions can be greatly improved. The present invention prevents surface stickiness and gives a product having an exceptional ability not to discolor upon exposure to the atmosphere as well as maintaining halogenated butyl rubber characteristic resistance to cracking.

More specifically, it has surprisingly been found that by incorporating an unsaturated fatty acid ester of a $C_8$ to $C_{30}$ fatty acid in a halogenated butyl rubber composition, a product of greatly improved resistance to discoloration is obtained. These unsaturated fatty acid esters are generally known as "drying oils," and have been employed in the paint industry. Preferably the ester is a glycerol ester of a $C_{14}$ to $C_{22}$ fatty acid, esters of conjugated $C_{14}$ to $C_{22}$ fatty acids being especially desirable. Normally, 5–50, preferably 10–25, parts by weight of unsaturated fatty acid ester is employed per 100 parts by weight of halogenated butyl rubber.

Examples of unsaturated fatty acid esters falling within the scope of the present invention are the following:

| Common Name | Approximate Fatty Acid Composition |
|---|---|
| Safflower Oil | 76% Linoleic, 14% Oleic, 4% Stearic, 6% Palmitic. |
| Linseed Oil | 53% Linolenic, 17% Linoleic, 20% Oleic, 4% Stearic, 6% Palmitic. |
| Tung Oil | 82% Eleostearic, 8% Linolenic, 5% Oleic, 1% Stearic, 4% Palmitic. |
| Fish Oil | 32–41% of $C_{20-22}$ Unsaturated, 12–17% Palmit-Oleic, 0–15% Linoleic, 10–27% Oleic, 1–3% Stearic, 14–16% Palmitic, 5–7% Myristic. |
| Soybean Oil | 50% Linoleic, 8% Linolenic, 28% Oleic, 6% Stearic, 8% Palmitic. |
| Dehydrated Castor Oil | 90% Ricinoleic, 5% Linoleic, 2% Oleic, 2% Stearic, 1% Palmitic. |
| Oiticica Oil | 82% Licanic, 5% Oleic, 6% Stearic, 7% Palmitic. |

For the sake of clarifying the nature of the low unsaturation rubbery copolymers to which the present invention is addressed, it is noted that copolymers of a major portion of an isoolefin and a minor portion of a multiolefin, particularly where the copolymers contain about 85 to 99.5 weight percent of a $C_4$ to $C_8$ isoolefin, e.g., isobutylene, with about 15 to 0.5 weight percent of a multiolefin of about 4 to 14 carbon atoms, e.g., myrcene, isoprene, butadiene, etc. are well known in the literature as "butyl rubber." For example, see "Synthetic Rubber" by G. S. Whitby, and U.S. Patent 2,356,128 among many others. Halogenated butyl rubber-type copolymers are produced by halogenating butyl rubber in a manner which does not substantially degrade its molecular weight but however gives a rubbery product of substantially different properties than the unhalogenated material. Butyl rubber may be halogenated at temperatures of −50 to 200° C., preferably 0° to 100° C., at pressures of 0.5 to 900 p.s.i.a. with suitable halogenating agents such as gaseous chlorine, liquid bromine, iodine monochloride, sulfenyl halide, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a non-solvent at about 0 to 180° C., spray drying, or by flashing off the hydrocarbon solvent by injection into a hot water bath.

Preferably, the degree of halogenation is carefully regulated so that the halogenated copolymer contains at least 0.5 weight percent of combined halogen but not more than about one atom of combined fluorine or chlorine per double bond in the polymer, nor more than three atoms of combined bromine or iodine per double bond. A more detailed description of the formation of chlorinated butyl rubber may be had by referring to co-assigned U.S. Patent 2,944,578, filed May 31, 1955.

The halogenated copolymer has a viscosity average molecular weight of about 100,000 to 2,000,000, and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

The compositions of the present invention containing halogenated butyl rubber and unsaturated fatty acid esters of $C_8$ to $C_{30}$ fatty acids may also contain various compounding agents. For example, the present compositions may contain zinc oxide or magnesium oxide, conventional curing agents such as sulfur, tetramethyl thiuram disulfide, etc. Conventional ingredients (per 100 parts of halogenated butyl rubber) such as 0–5 parts of a conventional bluing agent, e.g. Prussian blue, ultramarine blue, etc., may be used. The compositions preferably contain 10–50 parts by weight of a metallic oxide such as titanium dioxide or calcium oxide and fillers such as silica, talc, clay etc. In general, it will also be desirable to employ a minor quantity, e.g. 0.5–5 phr. of an anti-oxidant such as 2,2'-methylene bis(4-methyl-6-tert-butyl phenol) or N-lauroyl-p-aminophenol.

Compositions of the present invention may be cured at temperatures of 200–400° F., preferably 250–350° F., by any of the conventional techniques, e.g., steam curing, press curing, etc. Since the present compositions find particular use in pastel or white colored articles, the compositions of the present invention will normally be free of carbon.

The various aspects and modifications of the present invention will be made more clearly apparent by reference to the following description and accompanying examples.

A typical halogenated butyl rubber (MD–551), hereinafter termed "halogenated butyl rubber A," was prepared by halogenating butyl rubber with chlorine at a temperature of about 25° C. The resulting halogenating copolymer was composed of about 97 weight percent isobutylene, 1.8 weight percent isoprene and contained 1.2 weight percent combined chlorine and had a viscosity average molecular weight of about 400,000, a mole percent unsaturation of about 1.8 and a Mooney viscosity of 54 (8 minutes at 212° F.).

EXAMPLE I

Halogenated butyl rubber A was compounded with the various ingredients shown in Table I, all concentrations being in parts by weight. Sample A was a conventional light colored halogenated butyl rubber recipe whereas Sample B additionally contained tung oil. The recipes were white in color due to the presence of titanium dioxide and the absence of carbon. Typical 0.075" x 6" x 6" sheets were formed by placing compounds A and B in a suitable mold under high pressure. The recipes were then cured at 307° F. for 25 minutes (the vulcanizates having the physical properties shown in Table I).

*Table I*

| Sample | A | B |
| --- | --- | --- |
| Halogenated Butyl Rubber A | 100 | 100 |
| MgO | 10 | 10 |
| Talc | 70 | 70 |
| TiO₂ | 20 | 20 |
| Stearic Acid | 1 | 1 |
| Ultramarine Blue | 0.2 | 0.2 |
| 2,2'-methylene bis(4-methyl-6-tert-butyl phenol) (Antioxidant 2246) | 1 | 1 |
| 2-mercaptoimidazoline (NA-22) | 5 | 5 |
| ZnO | 10 | 10 |
| Tung Oil | | 20 |
| Cure: 307° F./25 minutes: | | |
| Tensile Strength, p.s.i. | 1,595 | 1,530 |
| Elongation, Percent | 690 | 790 |

As shown in Table I, the vulcanizates obtained had substantially equivalent properties.

Discs of about 1½" diameter were cut from both sample sheets and fixed to the sidewall of a conventional car tire which was thereafter utilized in normal driving. The tire containing sample patches was initially cleaned with detergent and water.

At the end of 6 weeks normal driving, the sample discs from the conventional recipe (Sample A) were dirty gray in appearance whereas patches prepared from Sample B (containing tung oil) were clean and white in appearance.

The tire patches were again cleaned by use of detergent and water, and then again used in normal driving for a period of about 3 weeks. At the end of 3 weeks, patches on the tire having the composition of Sample B were clean, whereas the patches prepared from Sample B were dirty gray in appearance.

The above results demonstrate the outstanding resistance of halogenated butyl rubber compositions to discoloration upon weathering when the compositions are compounded with an unsaturated fatty acid ester, e.g., an unsaturated fatty acid ester of a conjugated $C_{14}$ to $C_{22}$ fatty acid such as tung oil.

EXAMPLE II

In a manner similar to that described in Example I, halogenated butyl rubber is compounded in the manner shown in Table II.

*Table II*

| | Parts by wt. |
| --- | --- |
| Halogenated butyl rubber A | 100 |
| Talc | 90 |
| Titanium dioxide | 40 |
| Ultramarine blue | 0.1 |
| Stearic acid | 1 |
| Zinc oxide | 10 |
| 2,2'-methylene bis(4-methyl-6-tert-butyl phenol) (Antioxidant 2246) | 2 |
| Soybean oil | 15 |

The recipe of Table II is cured at 310° F. for 30 minutes. In the same manner as described in Example I, test patches are formed from the resulting vulcanizate and attached to a tire sidewall.

The tire, after initially being cleaned, is then used in conventional driving for a period of about 5 weeks. At the end of 5 weeks, patches formed from compositions shown in Table II are clean and white in appearance (whereas conventional formulations are dirty gray after being subjected to such usage).

This further illustrates the utility of unsaturated fatty acid esters of $C_8$ to $C_{30}$ fatty acids as a means of preventing discoloration of halogenated butyl rubber vulcanizates.

EXAMPLE III

Halogenated butyl rubber A is compounded with the various ingredients shown in Table III. The recipe is thereafter vulcanized at 307° F. for 45 minutes.

*Table III*

| | Parts by wt. |
| --- | --- |
| Halogenated butyl rubber A | 100 |
| MgO | 2 |
| Zinc oxide | 10 |
| Titanium dioxide | 30 |
| Stearic acid | 1 |
| Hydrated silica (Hi-Sil) | 60 |
| N-lauroyl-p-amino phenol (Succonox 12) | 2 |
| Zinc diethyldithiocarbamate | 1.5 |
| Dehydrated castor oil | 25 |

The vulcanizate obtained by curing the above recipe is sheeted out in the same manner as that previously described in Example I, and 1½" patches formed therefrom attached to the sidewall of a conventional tire. The tire, after cleaning with commercial scouring pads, is used in normal driving for a period of about 2 months.

At the end of 2 months, patches formed from the composition of Table III are relatively clean and white in appearance whereas patches formed from conventional recipes such as Sample A of Example I are dirty and gray in appearance under these same conditions. The effectiveness of dehydrated castor oil in maintaining the light color of halogenated butyl rubber vulcanizates is therefore illustrated.

Numerous modifications may be made to the present invention. For example, the compositions of the present invention may be vulcanized in the presence of highly unsaturated rubbers such as natural rubber, butadiene-styrene rubber, isoprene rubber, etc., to form compositions of improved resistance to discoloration. A light colored halogenated butyl rubber composition containing an unsaturated fatty acid ester of a $C_8$ to $C_{30}$ fatty acid may be used in conjunction with a tire made of another rubbery polymer. Additionally, compositions of the present invention may be vulcanized in the presence of regular butyl rubber to form compositions of improved resistance to discoloration which otherwise would not be practicable in butyl rubber articles since the unsaturated drying oils retard cures in unhalogenated butyl rubber.

In summary, the compositions of the present invention have clearly improved resistance to weathering and discoloration. Having described the present invention, that which is sought to be protected is set forth in the following claims.

What is claimed is:

1. A curable rubber tire sidewall composition having improved weathering properties consisting essentially of
    (A) a chlorinated rubbery copolymer of 85–99.5 wt. percent of a $C_4$ to $C_8$ isoolefin and 0.5 to 15 wt. percent of a $C_4$ to $C_{14}$ multiolefin and
    (B) 5 to 50 parts by weight of a drying oil chosen from the group consisting of safflower oil, linseed oil, tung oil, fish oil, soybean oil, dehydrated castor oil and oiticica oil per 100 parts by weight of rubbery copolymer.

2. The composition of claim 1 in which the isoolefin is isobutylene and the multiolefin is isoprene.

3. A pneumatic tire having a sidewall composition of improved weathering properties consisting essentially of a vulcanized rubbery compound containing
    (A) a chlorinated rubbery copolymer of 85–99.5 wt. percent of a $C_4$ to $C_8$ isoolefin and 0.5 to 15 wt. percent of a $C_4$ to $C_{14}$ multiolefin and
    (B) 5 to 50 parts by weight of a drying oil chosen from the group consisting of safflower oil, linseed oil, tung oil, fish oil, soybean oil, dehydrated castor oil and oiticica oil per 100 parts by weight of rubbery copoymer.

4. The composition of claim 3 in which the isoolefin is isobutylene and the multiolefin is isoprene.

5. A process for improving the weathering properties of a chlorinated copolymer of 85–99.5 wt. percent of a $C_4$ to $C_8$ isoolefin and 0.5 to 15 wt. percent of a $C_4$ to $C_{14}$ multiolefin which comprises admixing said copolymer prior to vulcanization with 5 to 50 parts by weight of a drying oil chosen from the group consisting of safflower oil, linseed oil, tung oil, fish oil, soybean oil, dehydrated castor oil and oiticica oil per 100 parts by weight of rubbery copolymer and heating the mixture at a temperature of about 200 to 400° F. for a sufficient time to effect a cure thereof.

6. The process of claim 5 in which the isoolefin is isobutylene and the multiolefin is isoprene.

References Cited in the file of this patent
UNITED STATES PATENTS

| | | |
|---|---|---|
| 2,694,692 | Amos et al. | Nov. 16, 1954 |
| 2,698,041 | Morrissey et al. | Dec. 28, 1954 |
| 2,833,734 | Morrissey et al. | May 6, 1958 |
| 2,901,447 | Lox | Aug. 25, 1959 |